(12) United States Patent
Farrugia et al.

(10) Patent No.: US 8,185,942 B2
(45) Date of Patent: May 22, 2012

(54) CLIENT-SERVER OPAQUE TOKEN PASSING APPARATUS AND METHOD

(75) Inventors: Augustin J. Farrugia, Cupertino, CA (US); Gianpaolo Fasoli, Palo Alto, CA (US); Jean-Francois Riendeau, Santa Clara, CA (US); Michael L. H. Brouwer, Sunnyvale, CA (US); Justin Henzie, Concord, CA (US)

(73) Assignee: Apple Inc., Cupertino, CA (US)

( * ) Notice: Subject to any disclaimer, the term of this patent is extended or adjusted under 35 U.S.C. 154(b) by 930 days.

(21) Appl. No.: 12/169,496

(22) Filed: Jul. 8, 2008

(65) Prior Publication Data
US 2009/0037725 A1 Feb. 5, 2009

Related U.S. Application Data

(60) Provisional application No. 60/963,260, filed on Aug. 2, 2007.

(51) Int. Cl.
*G06F 7/04* (2006.01)
(52) U.S. Cl. .......................................................... 726/9
(58) Field of Classification Search ...... 726/9; 713/155; 709/218, 224
See application file for complete search history.

(56) References Cited

U.S. PATENT DOCUMENTS

| 6,856,800 B1 | 2/2005 | Henry et al. | |
|---|---|---|---|
| 7,240,192 B1 * | 7/2007 | Paya et al. | 713/152 |
| 7,324,972 B1 * | 1/2008 | Oliver et al. | 705/40 |
| 7,774,428 B2 * | 8/2010 | Yu | 709/218 |
| 2002/0133412 A1 * | 9/2002 | Oliver et al. | 705/26 |
| 2005/0154909 A1 | 7/2005 | Zhang et al. | |
| 2007/0294388 A1 * | 12/2007 | Yu | 709/224 |

OTHER PUBLICATIONS

Apostolopoulos, G. et al. (Mar. 21, 1999). "Transport Layer Security: How Much Does It Really Cost?" *Proceedings of The Eighteenth Annual Joint Conference of the IEEE Computer and Communications Societies,* Mar. 21-25, 1999, 2:717-725.
European Search Report mailed on Jun. 10, 2008, for EP Application No. 08151965.4, filed on Feb. 26, 2008, 3 pages.
Rescorla, E. et al. (May 2000). "HTTP Over TLS," IETF Standards Memo, *The Internet Society,* located at <http://www.ietf.org/rfc/rfc2818.txt>, last visited on Jan. 19, 2010, 6 pages.

* cited by examiner

*Primary Examiner* — Samson Lemma
(74) *Attorney, Agent, or Firm* — Morrison & Foerster LLP

(57) ABSTRACT

In the computer client-server context, typically used in the Internet for communicating between a central server and user computers (clients), a method is provided for token passing which enhances security for client-server communications. The token passing is opaque, that is tokens as generated by the client and server are different and can be generated only by one or the other but can be verified by the other. This approach allows the server to remain stateless, since all state information is maintained at the client side. This operates to authenticate the client to the server and vice versa to defeat hacking attacks, that is, penetrations intended to obtain confidential information. The token as passed includes encrypted values including encrypted random numbers generated separately by the client and server, and authentication values based on the random numbers and other verification data generated using cryptographic techniques.

20 Claims, 4 Drawing Sheets

| | |
|---|---|
| Common variables to Options<br>i index of Server key to use<br>Ai: Server AES key (Shared between all server instances) 128/192 or 256 bits<br>header := i \| TS<br>plaintext := S | |
| Option 1 | Hi: Global Server HMAC key 160 bits<br>IV := 16 byte random initialization vector<br>ciphertext := AES_CBC_RandomPad(Ai, IV, plaintext)<br>tag := HMAC_SHA1(Hi, header \| ciphertext)<br>Sauth = IV \| header \| ciphertext \| tag |
| Option 2 | nonce := OCB nonce (either random, or based on some sequence number, reuse of a nonce is highly discouraged) use a 128-bit tag<br>(ciphertext, tag) := AES_OCB_Encrypt(Ai, nonce, header, plaintext)<br>Sauth = nonce \| header \| ciphertext \| tag |
| Option 3 | nonce := EAX nonce (either random, or based on some Sequence number, reuse of a nonce is highly discouraged) use a 128-bit tag<br>(ciphertext, tag) := AES_EAX_Encrypt(Ai, nonce, header plaintext)<br>Sauth = nonce \| header \| ciphertext \| tag |

FIG. 3

CLIENT-SERVER OPAQUE TOKEN PASSING APPARATUS AND METHOD

This application claims priority to U.S. provisional application 60/963,260 filed Aug. 2, 2007 incorporated herein by reference in its entirety.

FIELD OF THE INVENTION

This invention relates to computers and to computer networking, and more specifically to maintaining security in communications between clients and servers.

BACKGROUND

As well known in the computer field, client-server computing architecture separates a client from a server and is generally implemented over a computer network, such as the Internet. Each client or server connected to a network is also referred to as a node. The basic type of client-servers architecture employs two types of nodes, which are clients and servers. It allows computing devices to share files and resources. Each instance of the client software can send data requests to one or more connected servers. In turn, the servers accept these requests, process them, and return the requested information to the client. These days clients are most often web browsers, although not always. Servers typically include web servers, database servers, and mail servers. The present disclosure applies to all these types of servers. The interaction between client and server is often described using sequence diagrams.

Client-servers architecture enables the roles and responsibilities of the computing system to be distributed among several independent computers that are coupled only through the network. Typically the data is stored on the servers, which generally have greater security controls then most clients. In general in the field, it is believed that servers can better control access and resources, so as to guarantee that only those clients with the appropriate permissions may access and change data. Since data storage is thereby centralized, updates to that data are easier to administer than would be the case under a peer-to-peer (non-client server) architecture.

In a typical case when a user is visiting an e-commerce website, the user's computer and web browser together are considered the client, while the computer platform and database application that make up the online store are considered the server. When the web browser requests specific information from the online store, the server finds all of the data in the database needed to satisfy the request from the browser, assembles that data into a web page, and transmits that web page back to the web browser for viewing. Typical types of clients therefore include web browsers, email clients, and chat clients.

However in general, it is known that the client-server architecture is subject to security deficiencies in terms of user data being obtainable illegitimately by hackers. Organizations operating servers and offering client-server architectures for users are therefore constantly in threat of security breaches. The security breaches, of course, tend to focus on the server, which typically stores large amounts of information pertaining not only to the databases, for instance for the online store, but also a good deal of user information, such as passwords, credit card numbers, user addresses, emails, etc. Hence typically the security weakness in a client-server architecture is the centrality of user information being held at the servers.

SUMMARY

In accordance with this invention, a client-server architecture is provided where in order to enhance security, the bulk of the security verification activity takes place at the client rather than at the server. This is accomplished by using a token passing scheme. While token passing is well known in the network field, in this case the token is of a type referred to here as an opaque token or opaque data structure in which its internal contents are not readily discernable by a hacker or anyone else. This method also has the advantage of reducing the processing load on the server. It is another recognized shortcoming of current client-server architectures that typically the servers have a relatively low level of intelligence, in that they have limited processing capability, and do not have any means of retaining a state pertaining to their database. That is, they are relatively static in terms of the database state and are not capable of maintaining a dynamic set of data pertaining to users. That shortcoming is overcome here. Since in accordance with the invention the load on the server is reduced and each client request may be routed to a different server (in a cluster of servers), there is no need to maintain a server side state. Hence this provides a stateless authentication process.

In the computer science field, a state is a unique configuration of information in a computer program or computer. In a computer program, a state is a snapshot of the measure of conditions in the computing system. This limitation of typical servers relating to states, which is especially the case with typical web servers in the Internet field, leads to the above described security weaknesses allowing hacking of such servers. It also means that creating a robust security system in a client-server system is relatively difficult in the prior art.

In accordance with this disclosure, opaque token passing is used. There are security procedures established in both the client and the server which operate partly independently. The security information is passed between the two in the form of an opaque token. The token is opaque in the sense that both the client and the server are unable to reconstruct the token security information as generated by the other, but are able to accept it and pass it back. This allows the system to robustly authenticate the client to the server. The security information established at the client and server is typically based on generation of random numbers and cryptography. That is, in one embodiment the token is generated using a random number as the clear text, and then the random number is encrypted to provide part of the token.

The client and server each verify the security information as transmitted from the other one. This provides a form of symmetrical authentication with no state sharing and no state of key (cryptographic key) sharing, both of which enhance the overall security of the system. The server does not have the data or process to create a server state. This advantageously also puts more of the processing burden of the state at the client (user) side which is especially advantageous since as mentioned above, most web servers have limited processing capability currently.

Various options are provided here for the structure of the opaque token, each of uses a different type of cryptography in various examples disclosed herein.

BRIEF DESCRIPTIONS OF THE DRAWINGS

FIG. 3 shows various options for the authentication aspect of the token.

Figure 4:
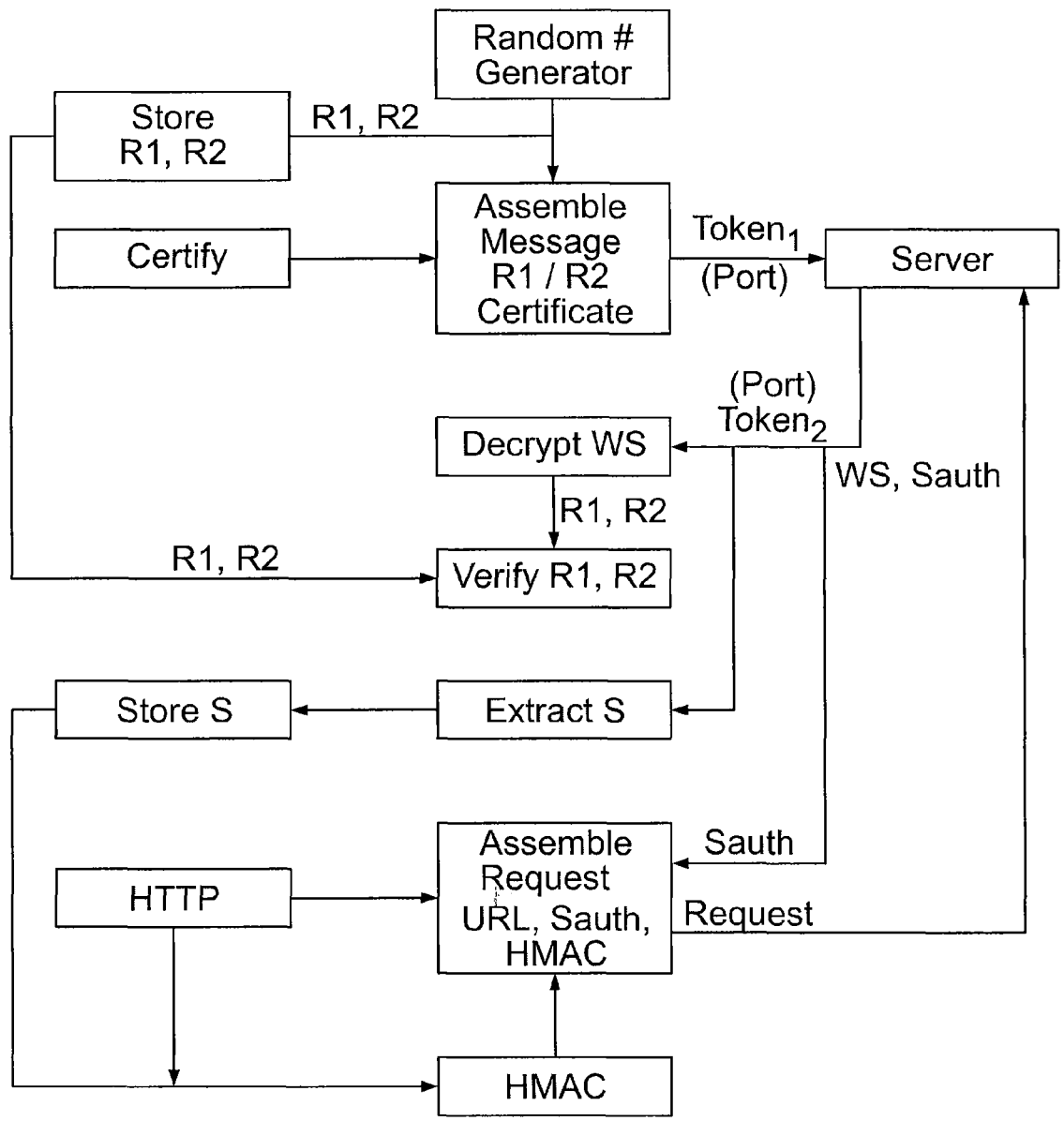
Figure 5:
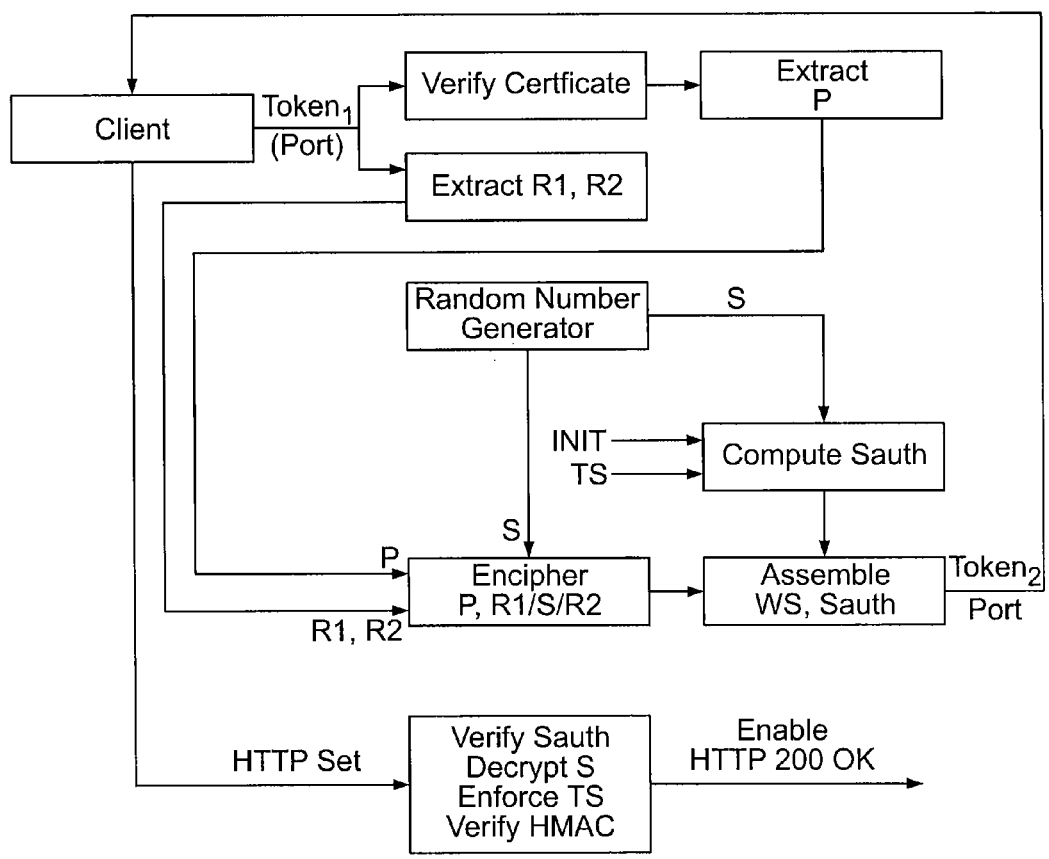

FIGS. 4 and 5 respectively show relevant portions of the present client and server.

DETAILED DESCRIPTION

Use of tokens and token passing is well known in the computer network field. Typically in the computer science field a token is a system object representing the subject and access control operations. Token objects are usually used to represent security information known about an authenticated user, but they are free form and can include any number of elements. In the Internet, tokens are generally used for indicating which side of a transaction, in terms of the client or server, is currently in control of the transaction and also for authenticating the client to the server and vice versa. Typically, either the client or server can only take the next communication action after it receives the token from the other side and authenticates it.

Figure 1:
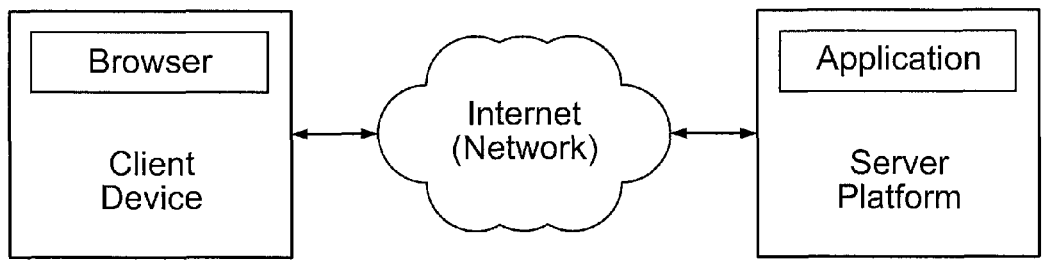
FIG. 1 shows a typical prior art client-server system as well known in the field and also as used in accordance with the invention.

FIG. 1 thus shows a conventional client-server arrangement (also as used in accordance with the invention) where the client is connected to the server via the Internet. It is understood the terms client and server here refer more generally to both the relevant computer software and the associated platform (machine) which is typically some kind of computing device such as a computer, personal digital assistant, mobile telephone, etc. These platforms are generally referred to as a device.

Figure 2:
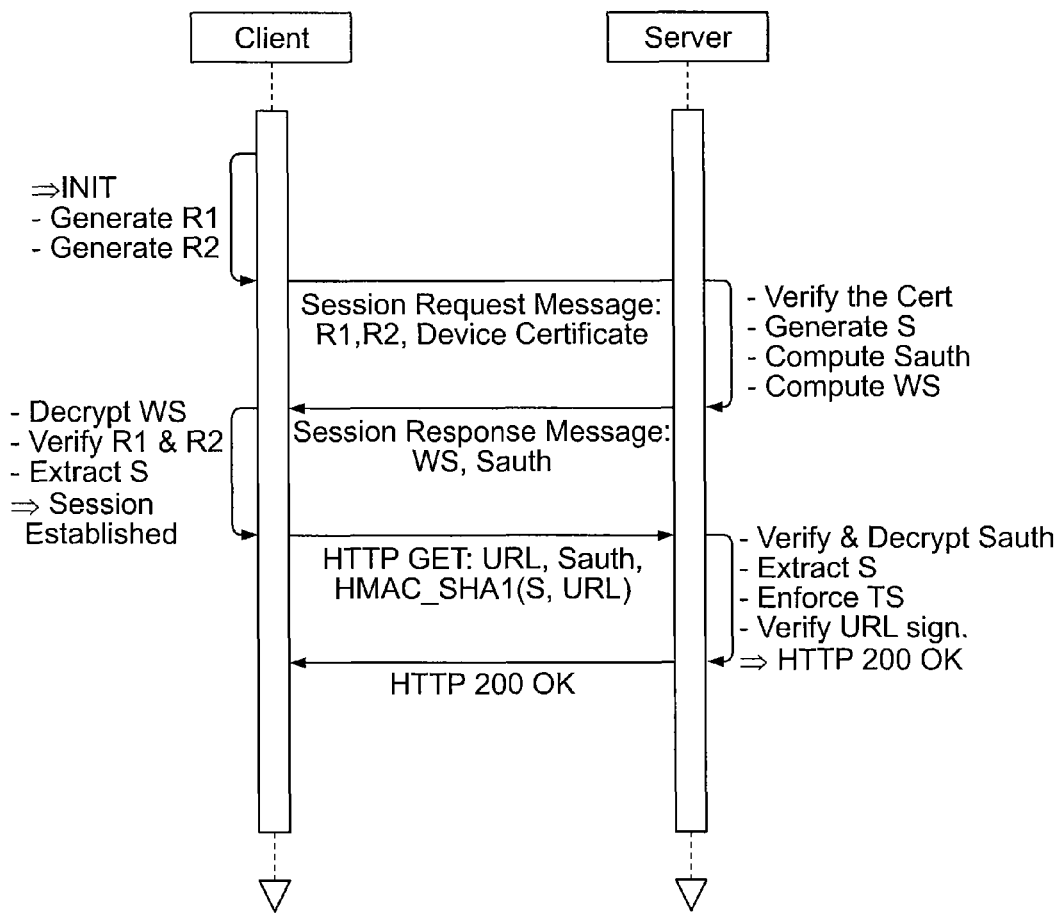
FIG. 2 shows in a sequence diagram (timeline) a process in accordance with the invention.

FIG. 2 shows an associated sequence diagram of a session in accordance with this invention with the client side activity on the left and the server side activity on the right. Time is represented by the dimension passing vertically down the page as indicated by the arrows. In this case, of course, the intermediary network which is typically the Internet is not shown since this diagram shows only the activities of the client and server for ease of understanding. It is understood that the communications therebetween are carried out by the conventional client-server architecture of FIG. 1.

In FIG. 2 the session, as it is referred to in the field, is initiated at the client side by the initialization (INIT) step. This initialization for these purposes consists of generating (in this example) two random numbers R1 and R2 which are conventionally generated by a random number generator program (code) at the client. (There may be one or three or more random numbers in other embodiments.) Instead of a random number, more generally another shared secret value may be used. It also is to be understood that the activities carried out here, both the client and the server, are carried out by software associated with each one in the form of computer code coded in any convenient computer language, such as C+.

Returning to FIG. 2, the client after generating numbers R1 and R2 transmits them to the server in a session request message (token) together with a device certificate. The device certificate is a set of bits (a numerical value) uniquely associated with the computing device (platform) upon which the client software is running. Typically, each computer or computing device or mobile phone or similar device has a unique device certificate which identifies it. Hence, the information as transmitted from the client to the server in the session request message includes random number R1, random number R2, and the device certificate which is typically an X.509 certificate, as well known in the field.

The client chooses R1 and R2 of a length such that the length of R1 plus the length of R2 plus 20 plus 3 (for in this case the RSA PKCS1 padding encryption protocol, see below) is equal to length of the public key which is part of the device certificate. Also, the client stores the values of R1, R2 in its associated (device) memory. In other embodiments, the number of random numbers is not restricted to two. The message length similarly is not restricted in other examples, unlike in this embodiment.

To illustrate this better, given an intended key which is 1024 bits (128 bytes) long, which is typical for a cryptographic key public P, the length of R1 plus the length of R2 should be 105 bytes, and each of R1 and R2 should be 35 to 70 bytes long. Of course, these limitations are merely illustrative and are dependent upon the particular types of cryptography used, as further described below.

The server upon receiving the session request message as indicated in FIG. 2 conventionally verifies the device certificate included therein. It also extracts the public key P from the certificate which is also conventional. The server then independently generates a new 20 byte long random number S. This random number S has no relationship to R1 or R2, but is generated by an independent random number generator present in the server software. Given the random number S, two further values are generated. One is the value WS which is an enciphered version of data including the random number S. (S is part of the server token used later to authenticate the client. The client will partially retrieve the server state to process the authentication data.) In one embodiment the encrypted information WS is an encrypted version of a data string which includes (in order) the public key P, the first random number R1, the server random number S, and the second random number R2. A typical suitable encryption technique to encrypt this data string is RSAPKCS1 version 1.5 with padding. To express this encryption algebraically, WS=RSA_E_PKCS1_V1.5PAD (P, R1/S/R2). RSAPKCS1 is a well known encryption scheme for implementing public key encryption based upon the well known RSA algorithm (using here public key P). In this case version 1.5 is used with padding. Since this encryption scheme is well known, further details are not given here. Any other type of data protection can be applied to protect the state information available to the client.

The server also generates another value referred to here as Sauth (S authorization value). Sauth represents the server state, and only the server is capable of retrieving that full state. Sauth is generated by a somewhat more complex process; three options or examples are given below for generating Sauth. Essentially, Sauth is another value generated using the value S plus other data and which is encrypted using a different (in this case symmetric) encryption technique. The various examples below show different symmetric encryption techniques for generating this authorization value Sauth. For purposes of FIG. 2, Sauth is an additional element used in the client-server token authorization. The server then having verified the device certificate, generated S, computed WS and computed Sauth, transmits back to the client the session response message (a second token) which includes the data string WS and Sauth, expressed algebraically as WS/Sauth. Thereby, the server sends a token to the client that contains the server state, but the client is able to extract part of that state for purposes of authentication.

This token is then received at the client. The client first extracts the value WS from the message (token). This value WS is then conventionally decrypted using the client's private decryption key to arrive at S. Note that the encryption technique (here RSAPKCS1V1.5) used to encrypt WS therefore must be known to the client along with a pre-assigned private decryption key. Since the decrypted string WS includes the values of P, R1, S and R2, the client is then easily able to extract the values of R1 and R2 from the decrypted message (token) and verify them. That is, it compares these values of R1 and R2 as extracted from the decrypted session response message and compares them to the originally generated R1 and R2 which are generated earlier in the session. This means that the client must also store in its associated memory the values of R1 and R2 when they are first generated.

Further, upon decrypting WS, the client extracts the value S. However, if the extracted values of R1 and R2 do not match the values of R1, R2 previously stored by the client, this indicates a token passing failure. In this case, the client is not permitted to retry the authentication for some particular period of time ("time out") such as a few seconds. The reason for this is that the failure to verify indicates that the server is not following the authorization protocol properly. This indicates most likely an attack by a hacker, rather than a legitimate server communication. The hacker attack is typically in order to extract the private key for the RSAPKCS1V1.5 decryption from the client. The time out is to discourage automatic retries in quick succession. Waiting a few seconds means that trying even a few thousand times would take a very long time and therefore this discourages this type of repetitive key attack.

In the most likely case when the session response message has been processed so as to verify that R1 and R2 as received from the server are legitimate, the client then extracts the value of S from that session response message and stores in the extracted S in its associated memory, and also stores in memory the received value Sauth to be used for the subsequent request. At this point the client-server session is actually established, as shown in FIG. 2. The client need only store the values of S and Sauth for the session henceforth, not R1 or R2.

Only at this point does the client actually make a request for actual information (data) to be downloaded from the server. The information request is typically for a particular web page data, file, etc. Therefore at this point at the third horizontal line shown in FIG. 2 (indicating a communication from the client to the server), the client makes its request which is for instance in the form of a message "HTTPget:URL" followed by authentication information. This indicates obtain the URL (uniform resource locator as well known in the field) as indicated. Of course, rather than using "URL" an actual web site address is typically used, or a web page address. HTTP is a reference to Hypertext Transfer Protocol, which is the transfer protocol used to transfer or convey information on the worldwide web. It typically refers to HTML hypertext pages. HTTP is a request/response protocol between clients and servers. In this case, the server conventionally typically stores or creates resources such as HTML files and images to be transmitted to the client.

This request also includes in addition to a specification of the requested URL, the value Sauth, and a digital signature. As shown the digital signature in this case is the function HMAC-SHA1(S, URL). HMAC is well known in the field. It refers to hash message authentication code. It is also referred to as a key-hash message authentication code. It is a type of message authentication code calculated using a cryptographic hash function in combination with a secret key. It is typically used to simultaneously verify both the data integrity and the authenticity of a message. Any iterative cryptographic hash function such as MD5 or SHA-1 may be used in calculation of an HMAC. The resulting message authentication code algorithm is referred to as HMAC-MD5 or HMAC-SHA-1 accordingly. In this case, the SHA-1 version is used but this is of course merely illustrative.

Note that the value S as generated by the server in one embodiment is a 20-byte long HMAC session key (value) randomly generated by the server as explained above. The value Sauth is created as described following. In this case the message authentication code (the HMAC signature) is a hash function of the session key S and the URL of the web page/web site which is being accessed. It is received by the server. Upon receipt, the server extracts the Sauth value from the client's request and verifies it and decrypts it. Of course, this verification is routine since Sauth was generated originally and saved in its memory by the server upon generating S and Sauth. Then the value S is extracted from Sauth. The server also verifies that the signature value HMAC-SHA-1 (S, URL) is correct. It can do this of course because it is also in possession of the HMAC-SHA-1 protocol which is widely known. If either the verification and decryption of Sauth or the extraction of S fail to match what they should be as earlier stored by the server, the server responds with an error or ignores the request from the client.

If both S and Sauth are verified as being correct, the server next checks if the value Sauth has expired. The expiration is based on the fact that when generated S has a time stamp (TS) associated with it. This is a particular second, minute, hour, day time stamp. The Sauth value is only good for a certain time, for instance, 30 minutes. After that, it expires. If however the value Sauth has not yet expired, the server services the current client request after verifying that the HMAC signature is correct as described above, and returns (in this case) the requested HTTP 200 URL information back to the client thereby servicing the request. This complete the transaction. In this case the token information passed back and forth between the client and the server includes, in addition to the actual HTTP request, the security information which is encapsulated and referred to here as a token. Since the contents of the token are generated by either the client or server, they may be verified by the recipient but not generated thereby; this is referred to as an "opaque token" here. Thus the token itself includes security elements in its construction. Of course, by token here we refer (conventionally) to a string of digital bits/bytes.

If in the final part of the session as indicated in the lower right hand part of FIG. 2 it has been determined that Sauth has time expired, then the client must obtain a new value of S and a new value of Sauth by returning to the beginning of the process shown in FIG. 2. Normally the client would obtain only one new S and Sauth pair for a given request. If the server responds that the received Sauth value has expired for a particular token which a client has just obtained after receiving a prior Sauth expired response for the same request, the server is considered to be a "rogue" and the client is required to stop communicating with that server for some substantial period time. The reason is that repeated defective server requests like this indicate a hacking attempt on the client.

As indicated above, there are many ways of creating Sauth. The following shows three options (examples). Of course these are merely illustrative and hence are specific. The details of these are shown in FIG. 3. For these three examples, each option has certain common variables shown in the uppermost panel of FIG. 3. The first variable is an index i, indicating which of several server encryption keys to use. Thus, the value Ai is the server key, for the AES encryption technique. This is shared between all server instances; it is typically 128, 192 or 256 bits long. AES is a well known cryptographic function which is commercially available. It refers to the Advanced Encryption Standard in cryptography, and adopted as an encryption standard by the U.S. Government. It is a symmetric key cryptography approach. The next common variable is the header, which is defined as the string of the index i followed by the time stamp TS which is generated as indicated in connection with FIG. 2. The last variable is the "plain text" which is the 20-byte HMAC session key S generated as explained above by the server.

Therefore, passing to the first example to generate the value Sauth, one defines the value Hi as being the global server HMAC key which here is 160 bits (20 bytes) long. The next aspect identified is the initialization vector IV which is a 16 byte long random initialization vector generated by a random number process (not shown) at the server. The next is the cipher text which is defined as the AES CBC encrypted version of the character string Ai, IV, plain text (which is S). This is typically encrypted using the AESCBC random pad encryption technique. Therefore, this is a two-key method using a generic composition and has been found to work well with typical versions of the open SSL security protocol well known in the Internet field. AESCBC random pad refers to a well known version of AES using a block cipher and a random padding function. Thus the cipher text is the value of the function as indicated in FIG. 3, option 1. Next the value of the tag is computed as shown. This tag is a digital signature generated using the above-described HMAC function operating on the string Hi, the header, and the cipher text. Last, the value Sauth is assembled which is the concatenated string of the IV, the header, the cipher text, and the tag.

The second option is a variant on the first option but structured somewhat differently. In this case Sauth is created using a single key OCB padding encryption method based on AES encryption. OCB refers to Offset Code Book mode. It is a well known mode of operation where a cryptographic block cipher is designed to provide both authentication and privacy. It integrates a message authentication code into the operation of a block cipher. This simplifies secure communications. It was developed by Philip Rogay. In this case the first variable is what is referred to in OCB jargon as a nonce, which is either a random number or based on a sequence number. Reuse of a nonce is discouraged in OCB. A 128 bit long tag is suitable. The concatenated value of the cipher text and the tag is equal to, as shown, the AES OCB encrypted version of the string Ai, the nonce, the header and the plain text S. Then the value Sauth is the string which is the initialization vector, the header, the cipher text and the tag concatenated together.

The third option is a variation on option 2, but rather than using the single key OCB padding for encryption it uses single key EAX encryption. EAX is slower than OCB but only uses one key, unlike the generic composition method of the first option. EAX mode is a mode of operation for cryptographic block ciphers. It is an authenticated encryption with an associated data algorithm. It is also intended to simultaneously protect both authentication and privacy of the message. It uses a two-pass encryption scheme, the first pass for achieving privacy and the second one for authenticity for each block of encrypted data. Again, this is well known. Otherwise, option 3 is similar to option 2, except it uses the AES EAX encryption technique to determine the cipher text, tag string. The value Sauth is a string organized similar to that in option 2.

Of course it is understood that these options/examples shown in FIG. 3 are merely illustrative of ways of computing Sauth and others will be apparent in light of this disclosure.

Note that in addition to a method, an apparatus is contemplated here. Effectively, there are two apparatuses; one is the client and its associated client software, and the second is the server and its associated server software, which together carry out the session shown in FIG. 2. Although typically expressed in terms of computer software, these may also be embodied in computer hardware or a combination thereof. Of course, in any case, the client and server sides must be coordinated in terms of how they carry out the authentication process as explained herein. In this case unlike the typical client-server situation, much of the intelligence for authentication resides at the client rather than at the server. Thus, client must be capable of executing the required computer processes, that is have sufficient memory and processing power.

FIG. 4 shows in a block diagram relevant portions of the client in a block diagram, following the flow of FIG. 2, left side. Note that the remainder of the client, being conventional, is not shown. FIG. 5 similarly shows relevant portions of the server in a block diagram.

Therefore, generally, the description herein is intended to be illustrative and not limiting to the invention. Further modifications and changes and improvements will be apparent to those skilled in the art in light of this disclosure and are intended to fall within the scope of the appended claims.

What is claimed as new and desired to be protected by Letters Patent of the United States is:

1. A computer enabled method of communicating between a client which is a computing device and a server over a computer network, comprising the acts of:
   generating a first token at the client;
   transmitting from a port of the client the first token to the server;
   receiving at a second port of the client in response a second token, which is a function of the first token;
   decrypting at least a portion of the second token at the client wherein another portion of the second token is a state of the server which cannot be fully retrieved by the client;
   verifying from the decrypted portion that the server received the first token;
   extracting a session key from the second token and storing the session key in a memory element;
   establishing a communication session between the client and server using the stored session key; and
   transmitting from the client to the server a communications request accompanied by the another portion of the second token and a proof established from the decrypted portion.

2. The method of claim 1, wherein the first token includes at least one secret value and a certificate associated with the client.

3. The method of claim 1, wherein the state of the server is a time stamp.

4. The method of claim 1, wherein the second token includes an encrypted function of a secret value generated by the server, and the client extracts from the decrypted second token the secret value generated by the server; and
   wherein the communications request is a function of the secret value generated by the server.

5. The method of claim 4, wherein the communications request includes:
   a uniform resource locator; and
   a digital signature which is a function of the uniform resource locator and the secret value generated by the server.

6. The method of claim 1, wherein upon a failure to verify, the client times out for a predetermined time.

7. A non-transitory storage medium storing computer code to carry out the method of claim 1.

8. A computing device programmed to carry out the method of claim 1.

9. A computer enabled method of communicating between a server which is a computing device and a client over a computer network, comprising the acts of:
   receiving at a port of the server a first token;
   verifying the first token at the server;

generating at the server a second token in response to the verification wherein a portion of the second token is a state of the server which cannot be fully retrieved by the client;

transmitting the second token to the client from a second port of the server;

receiving in response a request from the client, the request including a third token;

decrypting a portion of the third token to verify the third token; and in response to the verification, responding to the request.

10. The method of claim 9, wherein the first token includes at least a secret value and a certificate associated with the client, and wherein the server:

verifies the certificate;

generates a random number; and wherein the second token is a function of the random number.

11. The method of claim 10, wherein the second token includes an encrypted function of the random number, the certificate, and the secret value.

12. The method of claim 11, wherein the second token further includes an authentication value which includes:

an initialization value;

a key index;

an encrypted function of the second random number; and a digital signature.

13. The method of claim 12, wherein the encrypted function of the second random number is encrypted by one of AESCBC, AESOCB, or AESEAX.

14. The method of claim 1, wherein the server upon receipt of the request verifies the second token as being timely, and if not, responds to the request by indicating an error.

15. The method of claim 9, wherein the request includes a specified uniform resource locator.

16. The method of claim 10, wherein the server verifies the third token.

17. A non-transitory storage medium storing computer code to carry out the method of claim 9.

18. A computing device programmed to carry out the method of claim 9.

19. A client computing device which communicates with a server over a computer network, comprising:

a secret value generator;

a first memory device for storing the generated secret value;

a first assembly element coupled to the first memory device for assembling a first token, the first token including the secret value and a certificate associated with the client;

a first port coupled to the first assembly element, and which transmits the first token to the server over the computer network;

a second port for receiving a second token from the server;

a decryption element coupled to the second port for decrypting a first portion of the second token;

a verification element coupled to the decryption element, for comparing a part of the decrypted first portion to the stored secret value;

a second memory device coupled to the decryption element, for storing the part of the decrypted first portion;

a second assembly element coupled to the second port to receive therefrom a second portion of the second token, and coupled to receive a URL request;

a signature element coupled to receive the URL request and the second portion of the second token, and to provide a digital signature thereof;

wherein the second assembly element is coupled to the first port, for and which transmits to the server over the computer network the URL request, the second portion of the second token, and the digital signature.

20. A server computing device which communicates with a client over a computer network, comprising:

a first port coupled to receive a first token from the client transmitted over the computer network;

a first verifying device to extract from the first token a device certificate and verify the device certificate;

a random number generator;

a first encryption element coupled to the random number generator and to the first port and to the first verifying device, to encrypt a string including the random number, the certificate, and a value extracted from the first token;

a second encryption element coupled to the random number generator to encrypt the random number;

a source of a time stamp;

a source of an initialization value;

a digital signature generator coupled to the source of the time stamp and the second encryption element, to provide a digital signature of the time stamp and encrypted random number;

an authorization element assembler coupled to an output port of the digital signature generator, the source of the initialization value, the source of the time stamp, and the second encryption element, to provide therefrom a first part of a second token;

a second port coupled to the authorization element assembler and the first encryption element, to transmit to the client the second token including the first part of the second token and the encrypted string; and a second verifying device coupled to the first port to receive a request from the client, and adapted to extract therefrom an authorization portion, verify and decrypt the authorization portion, and upon verification, enable a response to the client of the request wherein the response is transmitted to the client over the computer network.

* * * * *